United States Patent [19]
Töpfer

[11] Patent Number: 5,333,940
[45] Date of Patent: Aug. 2, 1994

[54] TRACTOR/TRAILER BRAKE PRESSURE REGULATION METHOD AND SYSTEM

[75] Inventor: Bernhard Töpfer, Stuttgart, Fed. Rep. of Germany

[73] Assignee: Mercedes-Benz AG, Fed. Rep. of Germany

[21] Appl. No.: 944,324

[22] Filed: Sep. 14, 1992

[30] Foreign Application Priority Data

Sep. 17, 1991 [DE] Fed. Rep. of Germany ....... 4130848

[51] Int. Cl.⁵ ............................................. B60T 13/00
[52] U.S. Cl. .......................................... 303/7; 303/15; 303/9.62
[58] Field of Search ................... 303/3, 15, 20, 7, 9.62, 303/9.71, 113.5, 100; 188/112 A, 112 R; 364/426.02

[56] References Cited

U.S. PATENT DOCUMENTS

| Re. 33,697 | 9/1991 | McNinch, Jr. ............... 303/7 |
| 4,232,910 | 11/1980 | Snyder ...................... 303/7 X |
| 4,804,237 | 2/1989 | Gee et al. ................. 303/15 X |

FOREIGN PATENT DOCUMENTS 3037229 10/1982 Fed. Rep. of Germany .
2196074 4/1988 United Kingdom .

*Primary Examiner*—Robert J. Oberleitner
*Assistant Examiner*—Lee W. Young
*Attorney, Agent, or Firm*—Evenson, McKeown, Edwards & Lenahan

[57] ABSTRACT

A brake pressure regulation method and system for a trailer vehicle, which is connected to a tractor vehicle having an electronically controlled pressure-medium brake renders sensing of the forces between the tractor and the trailer vehicle and, to this extent, also a corresponding force-recording apparatus superfluous. The method can be used advantageously in tractor vehicles equipped with an ABS. The method is based on transmission of wheel speed signals from the trailer vehicle to the tractor vehicle and brings about an adjustment of the brake pressure relation between the tractor and the trailer vehicle to the same average speed of the wheels of non-driven axles of the vehicle by correcting the brake pressure for the trailer vehicle adaptively to give braking work which can be distributed in optimum fashion to the tractor vehicle and the trailer vehicle. Since, in this way, the average utilization of adhesion at braked wheels of the trailer vehicle is the same as that at the non-driven, braked wheels of the tractor vehicle, not only is an increase in directional stability during braking achieved but also an advantageous evenness of the brake lining wear on the tractor vehicle and the trailer vehicle. The method can also be carried out very advantageously in conjunction with electronically controlled pressure-medium ABS brake systems for trailer vehicles.

11 Claims, 2 Drawing Sheets

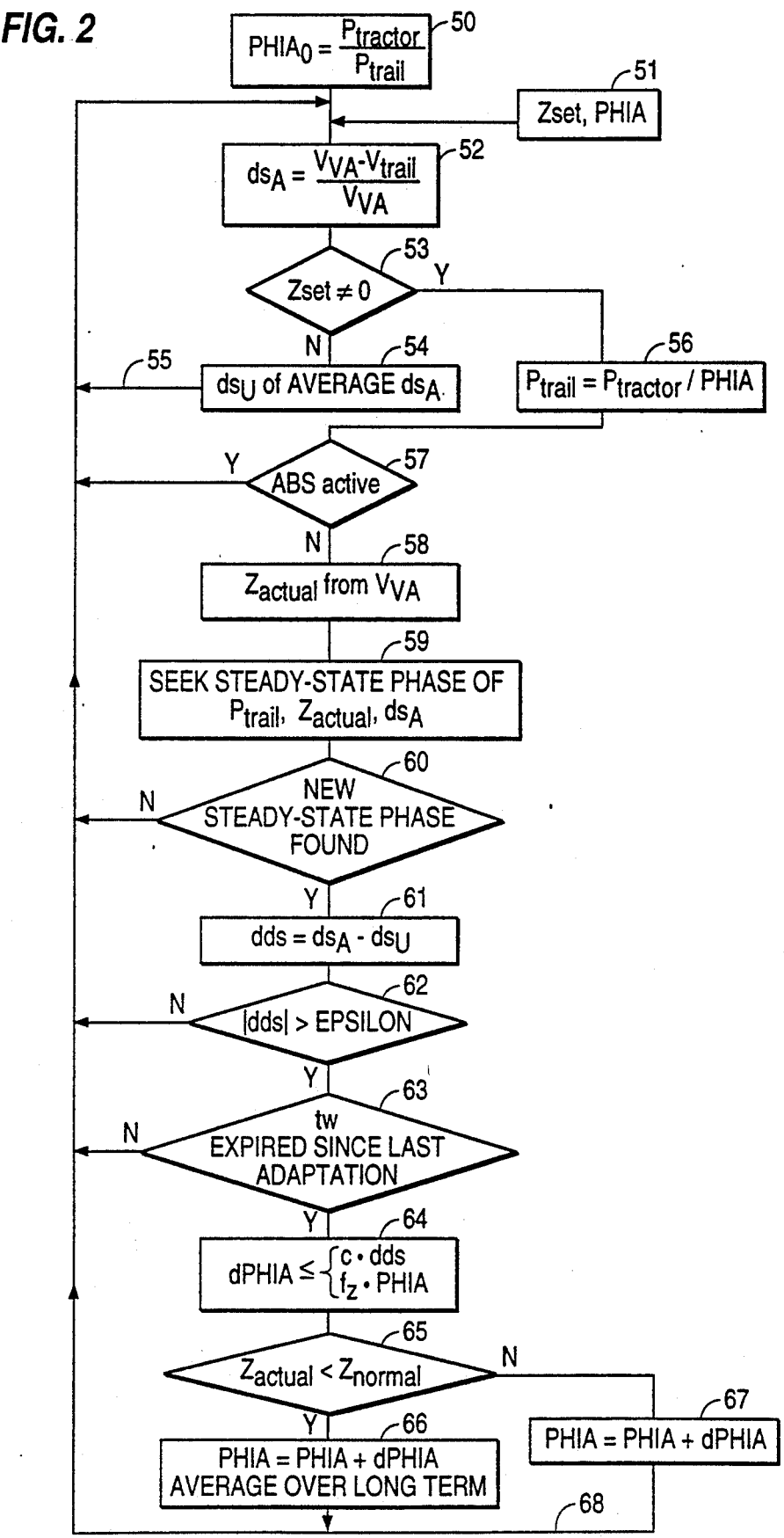

TRACTOR/TRAILER BRAKE PRESSURE REGULATION METHOD AND SYSTEM

CROSS-REFERENCE TO RELATED APPLICATION

This application is related to application Ser. No. 07/971,234 entitled METHOD OF DETERMINING AN OPTIMIZED VALUE OF BRAKE PRESSURE RATIO BETWEEN A TRACTOR AND A TRAILER OR SEMITRAILER filed in the name of Bernhard Töpfer, et al. on Nov. 4, 1992.

BACKGROUND AND SUMMARY OF THE INVENTION

The present invention relates to a brake pressure regulation method and system for a trailer vehicle which is connected to a tractor vehicle having an electronically controlled pressure-medium brake. The term "trailer vehicle" should here be taken to refer both to drawbar trailers and to semitrailers.

In vehicle combinations with conventional air brake systems, prescribed retardation bands are used in an attempt to achieve uniform participation of the tractor and the trailer vehicle in the braking work, i.e. the braking action both of the tractor and of the trailer vehicle must lie within certain band limits in relation to the pressure at the trailer connection used as a reference. These limits are relatively wide taking into account various limitations of conventional brake systems. In practice, this then leads in some cases to brake force distributions exhibiting a considerable error, especially in the range of the frequently occurring adaptive braking operations at a relatively low deceleration level. This results, inter alia, in extreme differences between the tractor and the trailer vehicle as regards the brake lining wear.

In electropneumatic brake systems, i.e. electrically/electronically controlled brake systems with wheel brakes actuated by compressed air, so-called coupling-force control systems are used in an attempt to improve the ratios. The function of these control systems is to detect "incorrect" brake pressure distributions and to influence the trailer control valve situated in the tractor in such a way that the forces between the tractor and the trailer vehicle are minimized.

German Offenlegungsschrift 3,901,270, for example, discloses an air brake arrangement for motor vehicles in which a sensor is arranged at a mechanical connection device for the vehicles in order to balance the braking action between the tractor and the trailer. The sensor measures the forces which occur at the connection device and controls a correction valve which is connected to the trailer supply line. Control is exercised via a control unit in which a control algorithm is installed to record and modify a pressure value and to emit signals which can be used to set a particular pressure in the trailer brake line.

German Auslegeschrift 2,164,325 also describes an apparatus for regulating the braking force at the wheels of motor vehicle trailers by influencing the pressure of the brake fluid for the trailer. This influence is exerted as a function of certain signals of a measuring element provided in the connection between the tractor vehicle and the trailer in order to measure the force occurring there. However, coupling-force sensors for rough conditions, as required by this apparatus or arrangement and by corresponding braking methods, are expensive and have to be continuously checked.

It is therefore an object of the present invention to provide a brake pressure regulation method for a trailer vehicle which is connected to a tractor vehicle having an electronically controlled pressure-medium brake which manages without sensing the forces between the tractor and the trailer vehicle. It is thus possible to dispense with corresponding coupling-force sensors and to have a method universally applicable, especially in conjunction with modern, electronically controlled power brake systems with ABS in tractor vehicles.

These objects have been achieved in a method for brake pressure regulation on a trailer vehicle including the steps of (a) obtaining wheel speed signals from non-driven wheels of the tractor vehicle and of the trailer vehicle;

(b) transmitting at least one signal representative of at least the wheel speeds of one axle of the trailer vehicle to the tractor vehicle;

(c) cyclically processing, together with wheel speed signals from the tractor vehicle, the at least one signal, representative of at least the wheel speeds of one axle of the trailer vehicle, in the electronic control unit, including (d) continuously forming and updating a sliding average ($ds_U$) of an instantaneous relative difference ($ds_A$) between average wheel speeds of non-driven wheels of the tractor vehicle and of the trailer vehicle in the unbraked condition from the beginning of a journey;

(e) in the case of a braking operation, calculating and making available the brake pressure for the trailer vehicle ($P_{trail}$), starting from a fixed starting value ($PHIA_o$) representative of the tractor vehicle for a brake pressure relation between the tractor vehicle and the trailer vehicle, as a product of a reference brake pressure of the tractor vehicle ($P_{tractor}$) and a pressure relation coefficient (PHIA);

(f) after the beginning of the braking operation, calculating the actual retardation ($Z_{actual}$) from the speed ($V_{VA}$) of non-driven wheels of the tractor vehicle;

(g) as braking continues, making a check, by analyzing the trailer brake pressure ($P_{trail}$), the instantaneous relative difference ($ds_A$) between average wheel speeds of non-driven wheels of the tractor vehicle and of the trailer vehicle and the actual retardation ($Z_{actual}$), to determine whether a steady-state braking phase is present;

(h) making a check to determine whether a difference (dds) between the instantaneous relative difference ($ds_A$) between average wheel speeds of non-driven wheels of the tractor vehicle and of the trailer vehicle over said steady state braking phase and the unbraked updated sliding average thereof ($ds_U$) has a larger absolute value than a threshold value EPSILON;

(i) if a steady-state braking phase is present and EPSILON is exceeded, then, calculating a change (dPHIA) in the brake pressure relation between the tractor vehicle and the trailer vehicle, this change being proportional to the current difference (dds) between said instantaneous relative difference ($ds_A$) between average wheel speeds of non-driven wheels of the tractor vehicle and of the trailer vehicle and the unbraked updated sliding average thereof ($ds_U$);

(j) adding the change (dPHIA) to the previous value ($PHIA_o$, PHIA); and (k) storing the resulting pressure relation coefficient (PHIA) adapted in the foregoing steps as the new pilot control value for distributing the brake pressure between the tractor vehicle and the trailer vehicle for the current journey.

Accordingly, the method of the present invention advantageously renders superfluous apparatus for detecting the coupling force between the tractor vehicle and the trailer vehicle since control is performed such that the mean utilization of adhesion at the axles of the trailer vehicle is as great as at those of the tractor vehicle. This aim is achieved by transmission of wheel speed signals from the trailer vehicle to the tractor vehicle since, in this way, the speeds of the wheels of all the axles are in the end adjusted to the same, if required normalized, mean value, and the brake pressure for the trailer vehicle is corrected or updated to give optimum distribution of the braking work between the tractor vehicle and the trailer vehicle.

Starting from a fixed initial value for the brake pressure distribution between the tractor and the trailer vehicle, an adaptive predetermination of the correct distribution of the braking force and, to this extent, the relation between the brake pressure level in the tractor vehicle and that in the trailer vehicle is taken as the basis for each current control intervention. This advantageously minimizes the necessity for current interventions in the range of customary retardations. For this purpose, the respectively expedient braking force distribution is determined and stored as a function of the retardation level demanded by the driver at the brake pedal even before the occurrence of large wheel speed differences between the axles of the tractor and the trailer vehicle, and is adapted (i.e. corrected) in the course of subsequent braking demands to the respective current requirements.

Generally speaking, the method according to the present invention makes it possible to use existing wheel speed transmitters of a tractor-trailer combination in order, on one hand, to provide possible balanced wear and, on the other hand, optimum utilization of the total braking capacity of the tractor vehicle and the trailer vehicle. Furthermore, the present invention has the advantage of minimizing the number of critical or highly stressed signal transmitters and their necessary connection paths to an electronic control unit in the tractor vehicle. To this extent, the method also brings about a considerable increase in the reliability of a corresponding brake system.

BRIEF DESCRIPTION OF THE DRAWINGS

These and other objects, features and advantages of the present invention will become more apparent from the following detailed description of a currently preferred embodiment when taken in conjunction with the accompanying drawings wherein:

FIG. 2 is a flow diagram of the method according to the present invention.

DETAILED DESCRIPTION OF THE DRAWINGS

Figure 1:
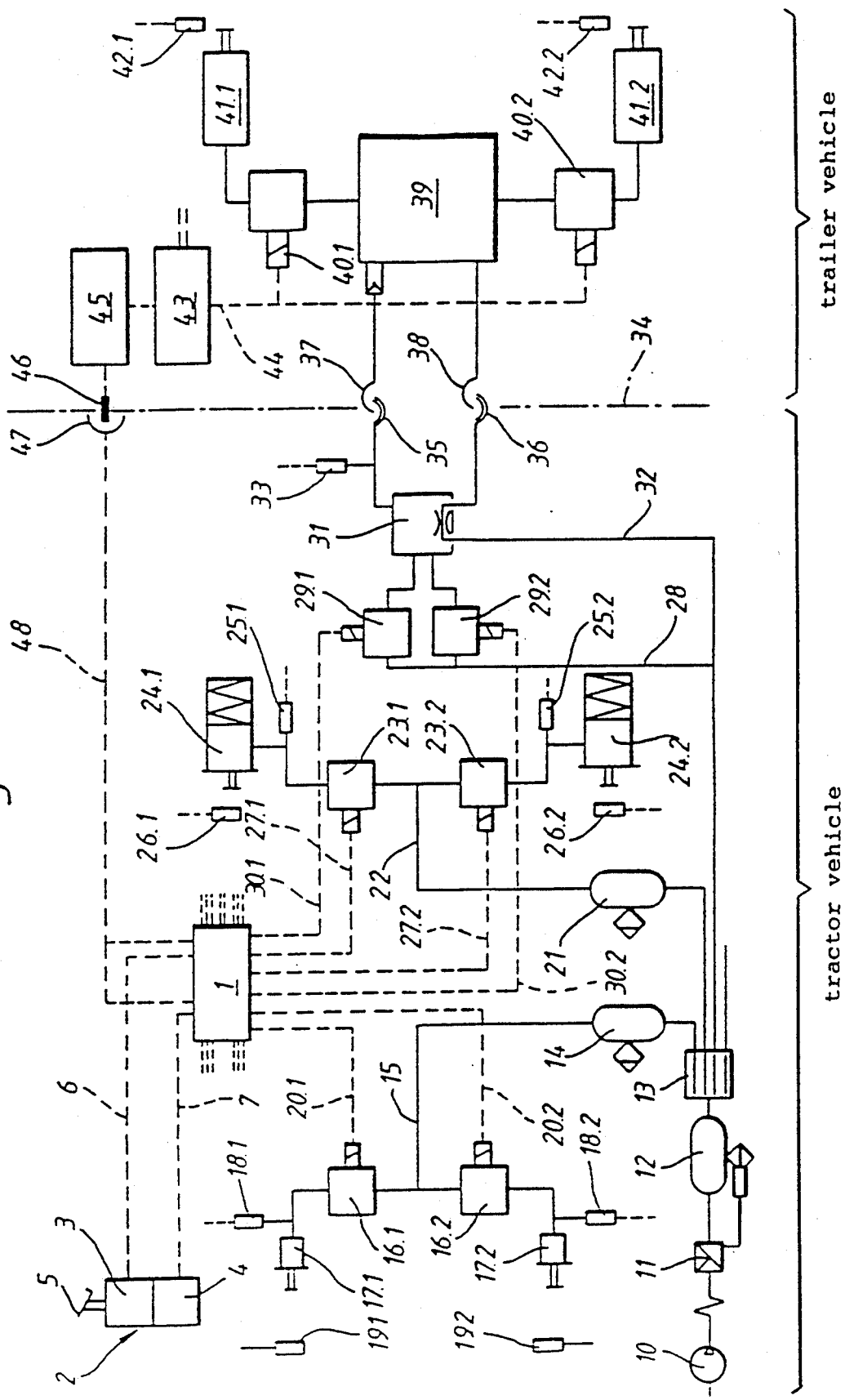
FIG. 1 is a schematic diagram of an electronic air brake system suitable for carrying out the method whose components are associated with the running gear.

Secondary reservoirs 14 and 21 in the brake system of FIG. 1 are supplied with a pressure medium by an air compressor 10 via a pressure regulator 11, a reservoir 12 and a multi-way safety valve 13. Two pulse-controlled regulating valves 29.1 and 29.2, and a trailer control valve 31 are supplied with pressure medium by the air compressor 10 via lines 28 and 32. The secondary reservoirs 14 and 21 are each assigned to one front-axle or rear-axle brake circuit of the tractor vehicle. Front-axle and rear-axle brake valves 16.1, 16.2 and 23.1, 23.2, respectively, are subjected to storage pressure by the secondary reservoirs via lines 15 and 22, respectively; these valves can be controlled by a central electronic brake control unit 1 via signal lines 20.1, 20.2 and 27.1, 27.2, respectively. From the above-mentioned valves, the pressure medium reaches the front-axle and rear-axle brake cylinders 17.1, 17.2 and 23.1, 23.2, respectively, and brake pressure sensors 18.1, 18.2 and 25.1, 25.2, respectively, assigned to the cylinders. The sensors emit signals to the electronic brake control unit 1, as do front and rear wheel speed sensors 19.1, 19.2 and 26.1, 26.2, respectively.

The wheel brake pressure apportioned to individual wheels is metered in accordance with the braking program in the control unit 1, which is supplied with these signals and with a setpoint deceleration demand signal from the service brake transmitter 2 actuated by a brake pedal 5. By way of example, the service brake transmitter 2 comprises two transmitter sections 3 and 4 connected to the control unit 1 via respective lines 6 and 7. Metering is preferably such that lock-up of the wheels of the tractor vehicle is prevented (ABS function) and as uniform a utilization of adhesion as possible at the axles is achieved in accordance with the actual loading condition.

The abovementioned regulating valves 29.1 and 29.2 for a trailer vehicle can be controlled in a corresponding manner by the control unit 1 via lines 30.1 and 30.2. The outputs of these two valves are passed to a trailer control valve 31. The trailer control valve 31 supplies a brake and storage gladhand 35 and 36, respectively, with pressure medium. The pressure at the brake gladhand 35 is recorded by a pressure sensor 33 connected (in a manner not shown for sake of simplicity and clarity) to the control unit 1.

To the right of the line 34, only exemplary parts of the brake system of the trailer vehicle need be depicted. The brake and storage gladhands 37 and 38 respectively are connected to a trailer brake valve 39 which, for its part, acts via ABS-pulsed regulating valves 40.1 and 40.2 on the brake cylinders 41.1 and 41.2 at at least one axle of the trailer vehicle. A trailer ABS control unit 43 electrically controls the ABS-pulsed regulating valves 40.1 and 40.2 via a line 44.

At least two associated wheel speed sensors 42.1 and 42.2 transmit corresponding wheel speed signals, here, for example, to the ABS control unit 43. The ABS brake control circuit for the trailer vehicle is thus closed. The trailer ABS control unit 43 is connected, for example, to an interface device 45, specifically a CAN controller, which provides wheel speed signals (if required already specially conditioned) at an interface part 46 on the trailer side. Via an interface part 47 on the tractor vehicle side and a signal line 48, the wheel speed signals of the trailer vehicle can be transferred to the central electronic brake control unit 1 of the tractor vehicle. Pressure-medium tanks of the trailer vehicle have here been omitted for the sake of simplicity but their provision, arrangement and use is readily ascertainable by one skilled in this art.

Such an operating structure of a pressure-medium brake system in the trailer vehicle is particularly advantageous for the feasibility of the method according to the present invention because it permits a certain pre-processing of the data in the trailer vehicle as regards the averaging, diameter correction, filtering etc. of wheel speeds, leading to a simple design of the interface 46, 47. This structure is not, however, a fundamental prerequisite for carrying out the method since, in principle, this requires only wheel speed sensors at braked wheels of the truck train and a possibility of whatever kind for transferring corresponding signals to an electronic brake control unit in the tractor vehicle providing braking demands and the supply pressure. The trailer vehicle thus does not necessarily have to have its own electric power supply, or even an electrical system and recording and signal processing apparatus requiring an electric power supply. The method can be carried out in a particularly advantageous manner, however, in an electronic control unit 1 with an ABS function for the tractor vehicle. The pulse-controlled regulating valves 29.1 and 29.2 for the trailer vehicle here act as if controlling and supplying an additional "axle" to be braked.

It is also within the scope of the present invention, for example, to record and/or transmit the wheel speeds of the trailer vehicle to the tractor vehicle inductively or optically and, as far as the central electronic brake control unit 1, in accordance with the number of braked and speed-recorded wheels of the trailer vehicle, all required signal paths and recording channels for the individual wheel speeds to be recorded of the trailer vehicle. The same applies, of course, to the wheel speeds of the tractor axles.

The braking method of the present invention now described with reference to the flow diagram in FIG. 2 for being carried out on corresponding brake systems such as the system described above with regard to FIG. 1.

At the beginning of a journey, a permanently stored fixed value $PHIA_o$, which had been finally determined beforehand as an average value (e.g. for an entire vehicle range) and is valid at the beginning of each initialization, is loaded for the brake pressure relationship $$PHIA = P_{tractor\ vehicle}/P_{trailer\ vehicle}$$

in step 50. $P_{tractor\ vehicle}$ is here preferably to be taken to refer to a weighted average of the brake pressures at the front and rear axle(s) of the tractor vehicle in the sense of a reference brake pressure of the tractor vehicle. Once the braking program has been initialized, this initial value $PHIA_o$ is optimized or updated in accordance with the following method scheme in the course of subsequent braking during the journey.

Synchronized cyclically to the program, in each case after 10 ... 50 ms (and, to this extent, virtually continuously) the difference $ds_A$, i.e. the difference related to the average speed $V_{VA}$ of brakable but non-driven tractor (front) wheels which is therefore a relative difference, between the average wheel speed $V_{VA}$ of the non-driven wheels of the tractor, i.e. its front wheels, and the average speed $V_{trail}$ of brakable wheels of the trailer vehicle is calculated during the entire journey in a step 52:

$$ds_A = (V_{VA} - V_{trail})/V_{VA}.$$

As long as retardations take place without the operation of an ABS, the average value $V_{VA}$ represents the actual driving speed with sufficient accuracy; it is also used further down to calculate the respective vehicle deceleration $Z_{actual}$ by differentiation or subtraction for a fixed time period.

In step 53, a check is made to determine whether unbraked travel is present, i.e. whether the retardation demand $Z_{set}$ stipulated by the driver via the brake pedal 5 is unequal or equal to zero. In the latter case, $ds_A$ merely reflects different tire diameters; in step 54, a sliding average is therefore formed for a certain time lag period, in practice about 0.1 ... 1.0 seconds, from such "unbraked" relative speed differences $ds_A$ and continuously updated, in order to smooth the signal. Averaging carried out for longer periods of time (up to, for example, 30 minutes) is also suitable. If there is no brake actuation, i.e. if $Z_{set}$ is equal to zero, the average of such "unbraked $ds_A$" obtained in this way is updated continuously via the path 55, whereas, in the case of brake actuation, it is retained as offset value $ds_U$ for the duration of the braking operation.

If, on the other hand, $Z_{set}$ deviates from zero in step 53, the vehicle is decelerating and the pressure of the brake fluid for the trailer vehicle is first of all determined and set in step 56 by way of the coefficient PHIA:

$$P_{trail} = PHIA^{-1} * P_{tractor}$$

Within the scope of this step, it is also possible for a routine check to be made to determine whether the brake pressure $P_{trail}$ obtained from this for the trailer vehicle is within the prescribed retardation bands mentioned earlier. If not, $P_{trail}$ can be limited to the relevant band limit.

A check is then made in step 57 to determine whether the current braking operation is or is not taking place in the range of ABS action. In the former case, no intervention is made in the pressure distribution PHIA between the tractor and the trailer vehicle and the program jumps back to the beginning of the loop. If the latter case, the respective vehicle deceleration $Z_{actual}$ is calculated in step 58 by differentiation or subtraction for a fixed period of time from the speed $V_{VA}$ of the non-driven (front) wheels of the tractor vehicle.

In the following step 59, the variables $P_{trail}$, $Z_{actual}$ and $ds_A$ are checked to determine whether they fulfil a condition for the presence of a steady-state phase.

In step 60, a check is made to determine whether such a steady-state phase has been found. If this is not the case, no intervention is made in the pressure distribution PHIA between the tractor and the trailer vehicle and the program jumps back to the beginning of the loop. If this is the case, however, a momentary change in the variable $ds_A$, i.e. the occurrence of a difference dds due to the braking forces, is evaluated in step 61 as an indication of an incorrect braking-force distribution. A positive value of dds, i.e. a relatively large relative speed of the non-driven (front) wheels of the tractor vehicle, signifies to this extent that the wheels of the trailer are on average running with a higher brake slip and, to this extent, therefore are being braked too heavily. In such a case, the brake pressure distribution PHIA should therefore be corrected in the direction of an increased share of braking for the tractor.

Before such a correction is carried out, an inquiry is made in step 62 as to whether the absolute value of dds is larger than a predetermined threshold value EPSILON. If this is not the case, no adaptation is made to the brake pressure distribution PHIA and the program jumps back to the beginning of the loop. Here, the magnitude of EPSILON is chosen in accordance with the scatter which is to be expected in the speed differences, thus, for example, EPSILON=0.03 ... 0.15% of the speed of travel.

If the absolute value of dds is larger than EPSILON, then an inquiry can take place in the next step 63 to determine whether a fixed minimum waiting time $t_w$, for example $t_w=0.2 \ldots 0.5$ seconds, has expired since the last adaptation of PHIA. If this is not the case, no adaptation is made to PHIA and, instead, the program jumps back to the beginning of the loop.

If this is the case in step 63, however, a current correction variable dPHIA for the brake pressure distribution PHIA is calculated in step 64, specifically $$dPHIA = c * dds$$

where, for example, $c=0.1$.

A check is also made here to determine whether the value obtained in this way is smaller than, or at most equal to, the product of the previously operative brake pressure distribution PHIA and a limiting coefficient $f_z$ where, for example $f_z=0.05 \ldots 0.1$. If this is not the case, the correction variable dPHIA is limited to the maximum value predetermined by the product ($f_z$*PHIA). PHIA should thus change by only 5 ... 10%, for example, per correction.

Finally, in step 65, an inquiry can furthermore be made to determine whether the current braking operation is taking place within the range of normal or low retardations, i.e. whether the current braking deceleration $Z_{actual}$ is smaller than a predetermined threshold value $Z_{normal}$ of, for example, 0.25 g.

In the latter case of "weak" braking, an average is formed "over the long term" in step 66 from the corrected brake pressure distribution PHIA and used as the initial value $PHIA_o$ for further braking operations of the current journey. "Over the long-term" here means primarily an average formation over the last (three, for example) PHIA values of a braking operation or—to compensate random disturbing influences—a sliding average formation over the last 30 minutes, for example, or over the last twenty to thirty braking operations, for example, of a journey.

If the retardation level $Z_{actual}$ is greater than, here for example, 0.25 g, the long-term average formation is suppressed and the correction of the brake pressure distribution PHIA is instead performed directly in step 67 just for the current braking operation; the program then returns to the beginning of the loop via path 68.

During the average formation for PHIA, the $PHIA_o$ values can advantageously be classified according to the respective retardation level $Z_{actual}$, thus, for example, into three classes, for instance [smaller than 0.1 g], [0.1 ... 0.18 g], [0.18 g ... 0.25 g], where g=9.81 m/s². The values are then stored correspondingly in classes, which are assigned to corresponding band widths of the braking demand ($Z_{set}$).

In the input step 51 preceding the enquiry about the current braking demand $Z_{set}$ in step 53, these values PHIA which have been classified as a function of $Z_{actual}$ can then be selected as in step 50 in accordance with the current braking demand $Z_{set}$ input at the brake pedal 5. Particularly finely graduated adaptation is in this way achieved.

In the method of the present invention, incorrect adaptations due to system dead times or signal scatter are suppressed in an effective manner by the adaptation of the brake pressure distribution between the tractor vehicle and the trailer vehicle taking place only in braking phases which have been identified beforehand as steady-state. In conjunction with this, the magnitude of dPHIA is provided with an upper limit and the waiting time $t_w$ between two successive adaptations of PHIA chosen such that retardation jolts and/or hunting and, to this extent, braking sequences which distract the driver do not occur.

It is evident that, when the trailer vehicle is equipped with an electronically acting anti-lock brake system 40.1, 40.2, 41.1, 41.2, 42.1, 42.2, 43 in accordance with FIG. 1, the method permits the use of a particularly simple and robust or sturdy signal interface 46, 47 since then average formations and speed normalizations or corrections in accordance with the method can take place in the trailer vehicle itself, thereby making it possible to reduce the signal path 48 to essentially one signal core in the direction of the tractor vehicle.

This does even more than increase the reliability and availability of the installation on the tractor vehicle. Because, in such a case, there are wheel speed sensors in the trailer vehicle in any case, the elimination of a coupling-force sensor and corresponding installation therefor also provides a cost saving over tractor vehicle ABS brake systems with a control and supply function for trailer vehicles, especially if, as illustrated in FIG. 1, redundant pneumatic control of the trailer control valve 31 is dispensed with.

The last-mentioned advantages are further reinforced if a signal specific to the wheel speeds of a plurality of wheels of the trailer vehicle is transmitted back via a special interface device of the communication controller type, for instance a CAN controller, in the trailer vehicle, since such a device can also be used to transfer information on the operating condition and diagnostic data from the individual elements of a corresponding ABS pressure-medium brake system in the trailer vehicle to the tractor vehicle. Such a transfer can be accomplished in a very robust manner via the same signal path to the central electronic control unit 1 in the tractor vehicle. The effect of this is that the possibility of undisturbed reception of diagnostic data in the tractor vehicle simultaneously signifies that the signal path for wheel speed signals from the trailer vehicle is free from faults and it is thus possible to dispense with separate monitoring of a special signal path for a speed signal from the trailer vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A brake pressure regulation method for a trailer vehicle connected to a tractor vehicle having a pressure-medium brake system controlled by an electronic control unit and supplied by the tractor vehicle with pressure medium, adaptive influencing of the brake pressure emitted to the trailer vehicle being performed in order to distribute the braking work between the tractor vehicle and the trailer vehicle, comprising the steps of:

(a) obtaining wheel speed signals from non-driven wheels of the tractor vehicle and of the trailer vehicle;

(b) transmitting at least one signal representative of at least the wheel speeds of one axle of the trailer vehicle to the tractor vehicle; and (c) cyclically processing, together with wheel speed signals from the tractor vehicle, the at least one signal, representative of at least the wheel speeds of one axle of the trailer vehicle, in said electronic control unit, wherein (d) a sliding average of an instantaneous relative difference between average wheel speeds of non-driven wheels of the tractor vehicle and of the trailer vehicle is continuously formed and updated in the unbraked condition from a beginning of a journey;

(e) in the case of a braking operation, the brake pressure for the trailer vehicle is, starting from a fixed starting value representative of the tractor vehicle for a brake pressure relation between the tractor vehicle and the trailer vehicle, calculated as a product of a reference brake pressure of the tractor vehicle and a pressure relation coefficient and correspondingly made available;

(f) after the beginning of the braking operation, the actual retardation is calculated from the speed of non-driven wheels of the tractor vehicle;

(g) as braking continues, a check is made, by analyzing the trailer brake pressure, the instantaneous relative difference between average wheel speeds of non-driven wheels of the tractor vehicle and of the trailer vehicle and the actual retardation, to determine whether a steady-state braking phase is present;

(h) a check is made to determine whether a difference between the instantaneous relative difference between average wheel speeds of non-driven wheels of the tractor vehicle and of the trailer vehicle over said steady state braking phase and the unbraked updated sliding average thereof has a larger absolute value than a threshold value;

(i) if a steady-state braking phase is present and the threshold value is exceeded, then a change in the brake pressure relation between the tractor vehicle and the trailer vehicle is calculated, this change being proportional to said current difference between said instantaneous relative difference between average wheel speeds of non-driven wheels of the tractor vehicle and of the trailer vehicle and the unbraked updated sliding average thereof;

(j) the change is added to the previous value; and (k) the resulting pressure relation coefficient adapted in the foregoing steps is stored as the new pilot control value for distributing the brake pressure between the tractor vehicle and the trailer vehicle for the current journey such that the brake pressure for the trailer vehicle is corrected or updated to provide optimum distribution of the braking work between the tractor vehicle and the trailer vehicle.

2. The method according to claim 1, wherein said reference brake pressure of the tractor vehicle is a weighted inter-axle average.

3. The method according to claim 1, wherein the cyclical processing steps are performed within an expanded antilock braking system function of an electronic antilock braking system control unit for the tractor vehicle, and a step of checking to determine whether the antilock braking system function is active is made before checking to determine the presence of a steady-state braking phase such that the foregoing step and all the subsequent steps are carried out only if the antilock braking system function is inactive.

4. The method according to claim 1, wherein, prior to the step of calculating the change in the brake pressure relation between the tractor vehicle and the trailer vehicle, a check is made to determine whether a waiting time has expired since the last adaptation of the brake pressure relation coefficient, such that the foregoing step and the following steps are carried out only if the waiting time has expired.

5. The method according to claim 1, wherein, prior to the step of storing the resulting pressure relation coefficient as the new pilot control value, a check is made to determine whether the actual retardation is smaller than a predetermined limiting value, such that, if an undershooting of said predetermined limiting value occurs, a longer-term average of a plurality of successive results of the step of adding the change to the previous value is in each case formed as the adaptation value.

6. The method according to claim 1, wherein the change in the brake pressure relation calculated in step is in each case limited to a value which corresponds to the product of the previous brake pressure relation and a limiting coefficient.

7. The method according to claim 1, wherein, prior to step (k), the results for the brake pressure relation coefficient are classified into different ranges prior to storage as a function of the respectively achieved retardation and, after the beginning of a braking operation, are in each case chosen accordingly as a function of the level of the current braking demand and used as current output values for the adaptation of the brake pressure relation.

8. The method according to claim 1, wherein a comparison of the brake pressure obtained for the trailer vehicle is carried out in the course of step (e) and, if the calculated result is outside a certain fixed band width, the relevant band limiting value is used as the determinant for the current brake pressure for the trailer vehicle.

9. The method according to claim 1, wherein an antilock brake system is provided in the trailer vehicle.

10. The method according to claim 9, wherein the anti-lock brake system in the trailer vehicle is electronically actuated, and a plurality of wheel speed signals are prepared by the trailer vehicle in an anti-lock brake system control unit in the trailer, and an interface device transmits at least one signal representative of at least the wheel speed of one axle of the trailer vehicle to the tractor vehicle.

11. The method according to claim 10, wherein the interface device comprises a CAN controller, and the at least one signal representative of at least the wheel speed of one axle of the trailer vehicle is transmitted to the tractor vehicle via a CAN signal path through which the CAN controller allows diagnostic data on condition of the elements of the brake system in the trailer vehicle to be transmitted to the tractor vehicle.

* * * * *